United States Patent
Rice et al.

(10) Patent No.: US 11,278,776 B2
(45) Date of Patent: *Mar. 22, 2022

(54) MULTIPLE-MATERIAL GOLF CLUB HEAD AND METHODS OF MAKING MULTIPLE MATERIAL GOLF CLUB HEADS

(71) Applicant: Callaway Golf Company, Carlsbad, CA (US)

(72) Inventors: Bradley C. Rice, Carlsbad, CA (US); Irina Ivanova, San Marcos, CA (US); William C. Watson, Temecula, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,143

(22) Filed: Nov. 9, 2020

(65) Prior Publication Data

US 2021/0052956 A1 Feb. 25, 2021

Related U.S. Application Data

(63) Continuation of application No. 16/734,640, filed on Jan. 6, 2020, now Pat. No. 10,835,788, which is a continuation-in-part of application No. 16/734,126, filed on Jan. 3, 2020, now abandoned, which is a continuation-in-part of application No. 16/401,013, filed on May 1, 2019, now abandoned.

(60) Provisional application No. 62/828,927, filed on Apr. 3, 2019, provisional application No. 62/821,318, filed on Mar. 20, 2019.

(51) Int. Cl.
*A63B 53/04* (2015.01)
*B22F 7/06* (2006.01)
*B33Y 80/00* (2015.01)

(52) U.S. Cl.
CPC .......... *A63B 53/0487* (2013.01); *B22F 7/062* (2013.01); *A63B 53/042* (2020.08); *B33Y 80/00* (2014.12)

(58) Field of Classification Search
CPC ...... A63B 2053/0416; A63B 2053/042; A63B 2053/0425
USPC .................................................. 473/342, 349
See application file for complete search history.

(56) References Cited

U.S. PATENT DOCUMENTS 8,641,556 B2 * 2/2014 Kuan ..................... A63B 53/04
473/340
10,835,788 B1 * 11/2020 Rice ....................... A63B 60/02
(Continued)

*Primary Examiner* — Raeann Gorden
(74) *Attorney, Agent, or Firm* — Rebecca Hanovice; Michael Catania; Sonia Lari

(57) ABSTRACT

A multiple material golf club head made of different metals that, when combined via additive manufacturing, transmit tensile or compressive force, shear force, bending moment, and torsional moment as if the different metal parts were a single piece of material is disclosed herein. In particular, the golf club head is a putter head with a body piece made of a first metal material that is in direct contact with a face piece made of a second metal material, and applied via additive manufacturing, such that load conditions are transmissible at a boundary between these two pieces. The second metal material forms at least a portion of the striking surface and a lower region of the hosel, and the interface between the two materials is contiguous from the face to the hosel.

16 Claims, 6 Drawing Sheets

(56) References Cited

U.S. PATENT DOCUMENTS

2012/0157226 A1\* 6/2012 Narita ................ A63B 53/0487
473/329
2013/0095953 A1\* 4/2013 Hotaling ................ A63B 60/00
473/332

\* cited by examiner

MULTIPLE-MATERIAL GOLF CLUB HEAD AND METHODS OF MAKING MULTIPLE MATERIAL GOLF CLUB HEADS

CROSS REFERENCES TO RELATED APPLICATIONS

The present application is a continuation of U.S. patent application Ser. No. 16/734,640, filed on Jan. 6, 2020, and issued on Nov. 17, 2020, as U.S. Pat. No. 10,835,788, which claims priority to U.S. Provisional Patent Application No. 62/828,927, filed on Apr. 3, 2019, and is a continuation-in-part of U.S. patent application Ser. No. 16/734,126, filed on Jan. 3, 2020, which is a continuation-in-part of U.S. patent application Ser. No. 16/401,013, filed on May 1, 2019, which claims priority to U.S. Provisional Application No. 62/821,318, filed on Mar. 20, 2019, the disclosure of each of which is hereby incorporated by reference in its entirety herein.

STATEMENT REGARDING FEDERALLY SPONSORED RESEARCH OR DEVELOPMENT

Not Applicable

BACKGROUND OF THE INVENTION

Field of the Invention

The present invention relates to multiple material golf club heads, particularly putters, and methods of making such golf club heads using additive manufacturing. More specifically, the present invention is directed to a golf club head made of different metallic pieces that, when combined via additive manufacturing, look and behave like a monolithic piece of material when the golf club head is at rest, but exhibit different properties upon impact with a golf ball.

Description of the Related Art

Prior art multiple-material golf club heads, and particularly putters, typically include bodies made of hard metal materials, with softer materials inserted into face recesses to affect vibration frequency. The pieces of the putter, which are made separately of different materials, are typically combined using some sort of mechanical fastener, bonding, or welding process. These mechanisms of combining the two pieces do not ensure that the different materials connect completely to one another, e.g., along all surfaces facing one another. Each of these means of attaching pieces provides only incidental or local contact between surfaces of the materials, thus prohibiting the transmission of local shear. Therefore, there is a need for a multiple-material golf club head that can transmit shear, as well as other loading conditions, across the entire boundary between the pieces.

BRIEF SUMMARY OF THE INVENTION

One aspect of the present invention is a golf club head made of dissimilar materials that are attached to one another via additive manufacturing so that they fully contact one another along the surfaces that face one another, without added fasteners, rivets, or traditional adhesives. At all locations where the dissimilar materials contact one another, they are capable of transmitting shear loads, tensile loads, compressive loads, moments, and torsion.

Another aspect of the present invention is a putter made from at least two visually distinctive different materials, which are attached to one another via a physical bond that makes the putter appear to constitute a single piece. This multi-material piece looks and performs like a single metal piece statically, but when impacted by a golf ball, exhibits different properties than either of the materials would exhibit independently. The distinctive materials are configured in such a way to benefit the performance and cosmetic appeal of the putter. Both the body and the hosel of the putter contain the visually distinctive materials, one of which preferably is composed of a metal alloy comprising copper.

Yet another aspect of the present invention is a putter head comprising a body piece comprising a heel side, a toe side, a top surface, a bottom surface, a rear side, a first hosel portion, a front face surface, and a front hosel surface, and a face piece comprising a face portion, a second hosel portion, a face rear surface, and a hosel rear surface, wherein the entirety of the face rear surface makes direct contact with the front face surface to form a face interface boundary, wherein at least a portion of the hosel rear surface makes direct contact with the front hosel surface to form a hosel interface boundary, wherein the hosel interface boundary is contiguous with the face interface boundary, wherein the body piece is composed of a first metal material having a first hardness and a first modulus of elasticity, wherein the face piece is composed of a second metal material having a second hardness and a second modulus of elasticity, wherein the face portion has a thickness of at least 0.020 inch, wherein the second hardness is 35% to 85% of the first hardness, and wherein the second modulus of elasticity is 40% to 80% of the first modulus of elasticity.

In some embodiments, the front surface of the body may comprise a geometric center and a center region, the center region may be an area extending one inch toward the toe side and one inch toward the heel side from a centerline extending vertically through the geometric center, and the face piece may cover the center region. In other embodiments, the first metal material may comprise a first density, and the second metal material may comprise a second density that differs from the first density by at least 10%. In still other embodiments, the second metal material may have a hardness of 100-110 HV and a modulus of elasticity of approximately 18.5 Msi. In some embodiments, the first material may have a hardness of 200-240 HV and a modulus of elasticity of approximately 28.0 Msi.

In any of the embodiments, the rear surface and the front surface may transmit tensile and compressive force, shear force, bending moment, and torsional moment at both the face interface boundary and the hosel interface boundary. In still other embodiments, the face portion may have a constant thickness, and each of the first hosel portion and the second hosel portion may have a variable thickness. In some embodiments, the strain of the first material may be the same as the strain of the second material at both the face interface boundary and the interface boundary, and the interface boundary may withstand no less than 50% of a yield stress of the weaker of the first and second materials. In a further embodiment, interface boundary may withstand up to 75% of the yield stress of the weaker of the first and second materials. In any of the embodiments, the first metal material may be stainless steel and the second metal material may be an alloy comprising at least 55% copper by weight. In some embodiments, the putter head may have a mass of 300 grams to 400 grams.

Another aspect of the present invention is a putter head comprising a body piece comprising a heel side, a toe side, a top surface, a bottom surface, a rear side, a hosel portion, a front face surface, and a hosel rear surface, a face piece comprising a face portion and a face rear surface, and a hosel piece comprising a hosel front surface, wherein a majority of the face rear surface makes direct contact with the front face surface to form a face interface boundary, wherein at least a portion of the hosel rear surface makes direct contact with the hosel front surface to form a hosel interface boundary, wherein the body piece is composed of a first metal material having a first hardness and a first modulus of elasticity, wherein at least one of the face piece and hosel piece is composed of a second metal material having a second hardness and a second modulus of elasticity, wherein the face portion has a thickness of at least 0.020 inch, wherein the second hardness is 35% to 85% of the first hardness, and wherein the second modulus of elasticity is 40% to 80% of the first modulus of elasticity. The face and hosel pieces are preferably affixed to the body piece using an additive manufacturing process.

In some embodiments, each of the face piece and hosel piece may be composed of the second metal material. In other embodiments, the first metal material may be a stainless steel, and wherein the second metal material may be an alloy comprising at least 55% copper by weight. In still other embodiments, the hosel piece may be spaced at least 0.250 inch from a topline of the body. In still other embodiments, at least one of the first and second metal materials may be an alloy comprising at least 55% copper by weight. In any of the embodiments, the face piece may have a non-uniform thickness. In some embodiments, each of the hosel portion and the hosel piece may have a variable thickness. In any of the embodiments, the first metal material may comprise a first density, and the second metal material may comprise a second density that differs from the first density by at least 10%. In still other embodiments, the body piece may comprise a through-opening, and a portion of the rear surface of the face piece may be visible through the through-opening.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 11:
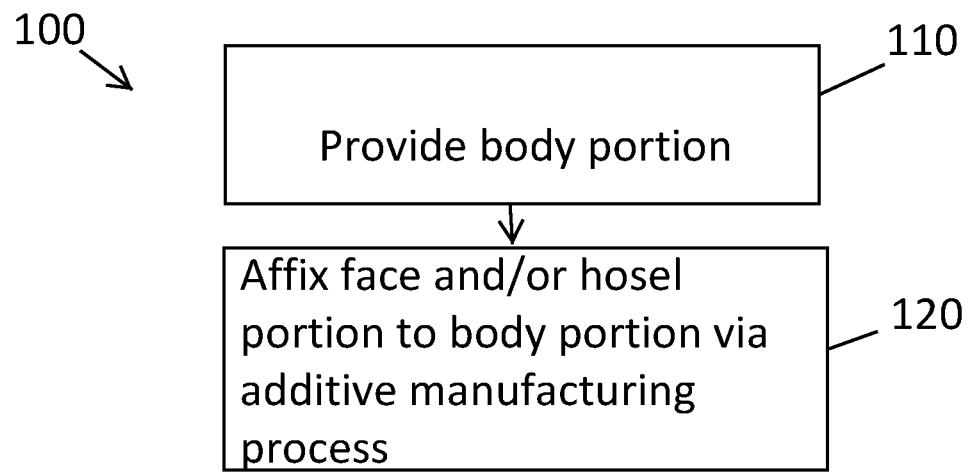
FIG. 11 is a flow chart describing a preferred golf club head manufacturing method of the present invention.

The present invention is directed to a golf club head with two distinctive metallic pieces having opposing surfaces that that make direct contact with one another across the entirety of each surface's area. Preferably, the metals are affixed to one another via additive manufacturing, as described in FIG. 11.

The preferred embodiment of the present invention, shown in FIGS. 1-4, is a putter head 10 with a body piece 20 and a face piece 30. The body piece 20 includes a heel side 21, toe side 22, top surface 23, bottom surface 24, rear side 25, front face surface 26, first hosel portion 60, and front hosel surface 62. The body piece 20 is composed of a primary, base metal material, such as stainless steel, and in one specific embodiment, a stainless steel tungsten alloy with a density of 8.8-12.5 g/cc. The face piece 30 comprises a striking face portion 32, a second hosel portion 65, face rear surface 34, and hosel rear surface 66. The face piece 30 is composed of a secondary metal material that differs from the base metal material, and preferably an alloy with a composition that is at least 55% copper (e.g., brass, bronze, etc.).

The entire area of the rear face surface 34 is in direct contact with the front face surface 26, creating an interface boundary 40 between the two materials. This means that at all locations along the face interface boundary 40 where the primary and secondary materials make contact, the body and face pieces 20, 30 transmit tensile or compressive force, shear force, bending moment, and torsional moment. Similarly, the entire area of the rear hosel surface 66 is in direct contact with the front hosel surface 62, creating a hosel interface boundary 45 with the same transmission capabilities as the face interface boundary 40. The hosel interface boundary 45 preferably is contiguous with the face interface boundary 40 for the purpose of performance and aesthetic consistency. The first and second hosel portions 60, 65, taken together, form a complete hosel 68.

Figure 10:
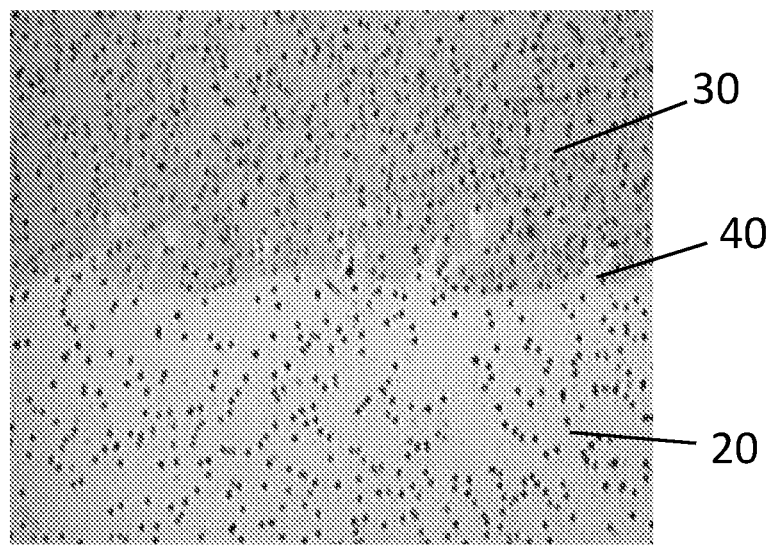
FIG. 10 is a cross-sectional view of the circled portion of the interface shown in FIGS. 4, 7, and 8.

In the embodiments disclosed herein, the secondary metal material preferably is deposited onto the body piece 20, which may be a traditional metal piece created via casting, forging, metal injection molding, or other processes known to a person skilled in the art, in powder form (5μ to 150μ, wire form (0.020 inch to 0.800 inch in diameter), or foil form (0.005 inch to 0.030 inch thick). The additive process creates a metallic bond between the base metal material and the deposited metal material, as shown in FIG. 10. In an alternative method, the body piece 20 may be formed via additive manufacturing, with the primary metal material being deposited in powder, wire, or foil form, and then the secondary metal material is deposited onto the primary metal material as disclosed above. Either way, the preferred manufacturing method 100 follows the steps illustrated in FIG. 11, with a first step 110 of providing the body piece or portion 20 and a second step 120 of affixing the face and/or hosel piece or portion 30, 50 to the body portion 20 via an additive manufacturing process. The additive manufacturing process allows for the transmission of tensile or compressive force, shear force, bending moment, and torsional moment across the interface boundary 40 as described above.

Figure 1:
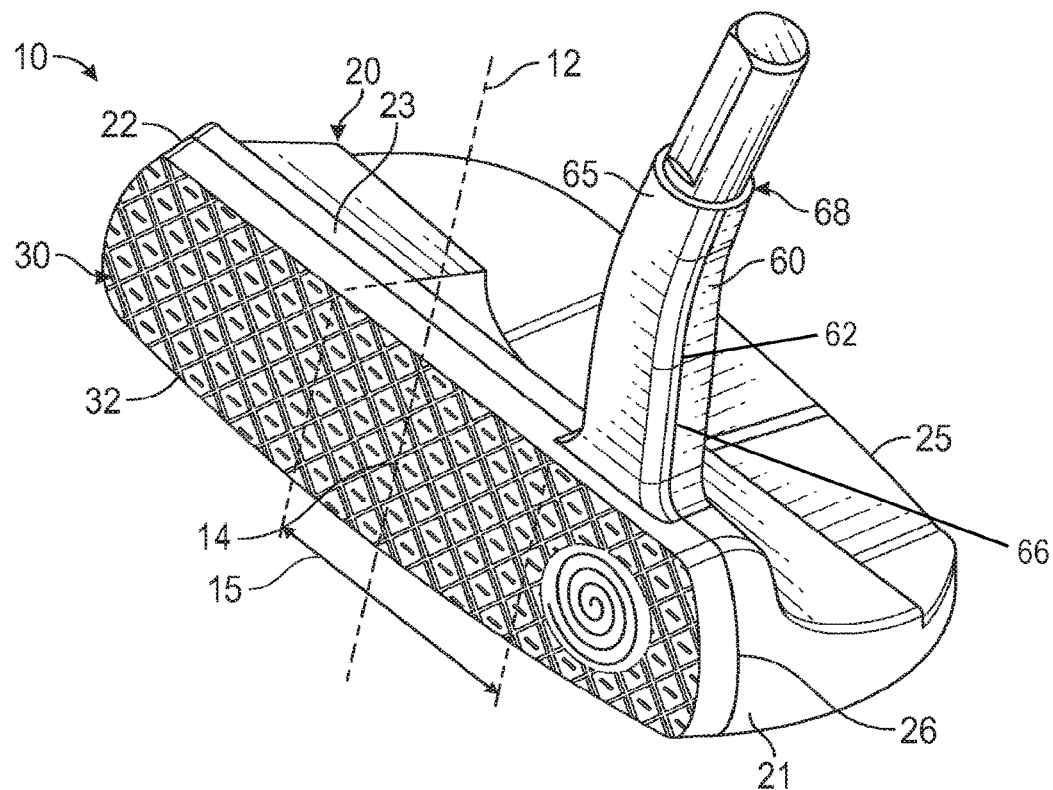
FIG. 1 is a perspective view of a first embodiment of the golf club head of the present invention.
Figure 2:
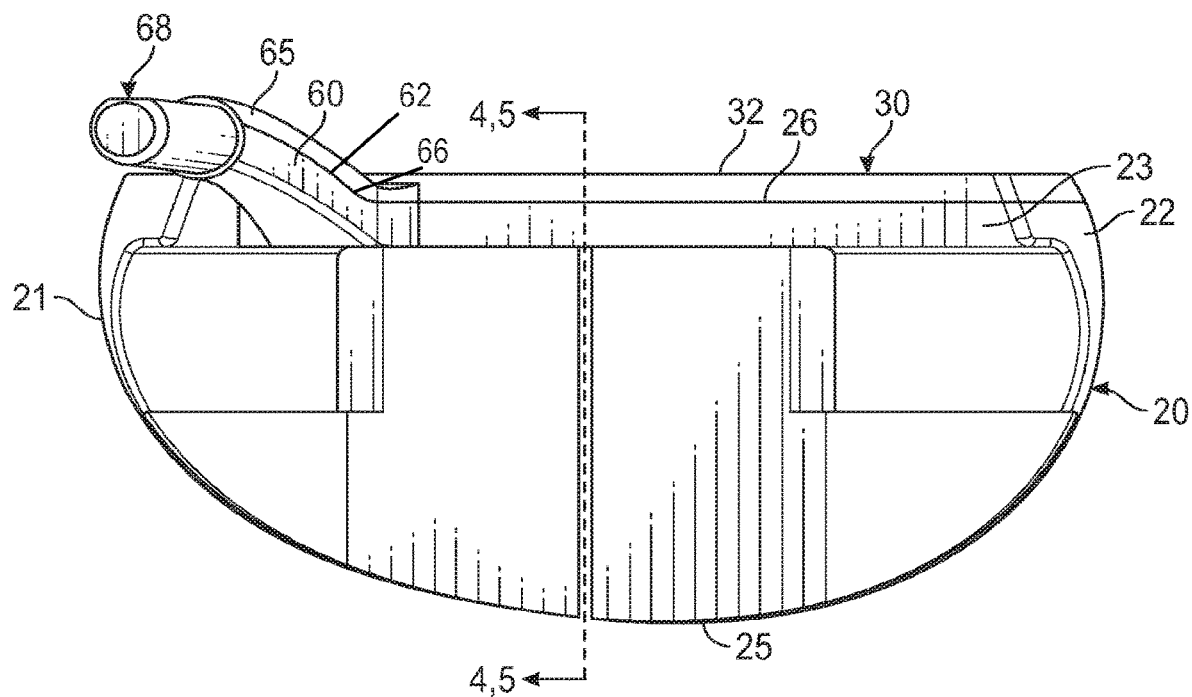
FIG. 2 is a top elevational view of the golf club head shown in FIG. 1.
Figure 3:
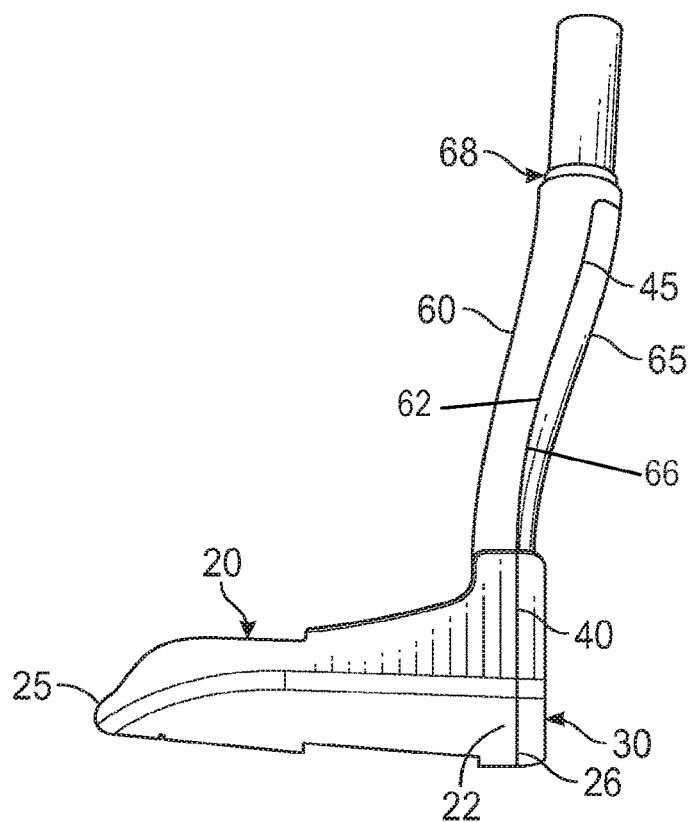
FIG. 3 is side elevational view of the golf club head shown in FIG. 1.
Figure 4:
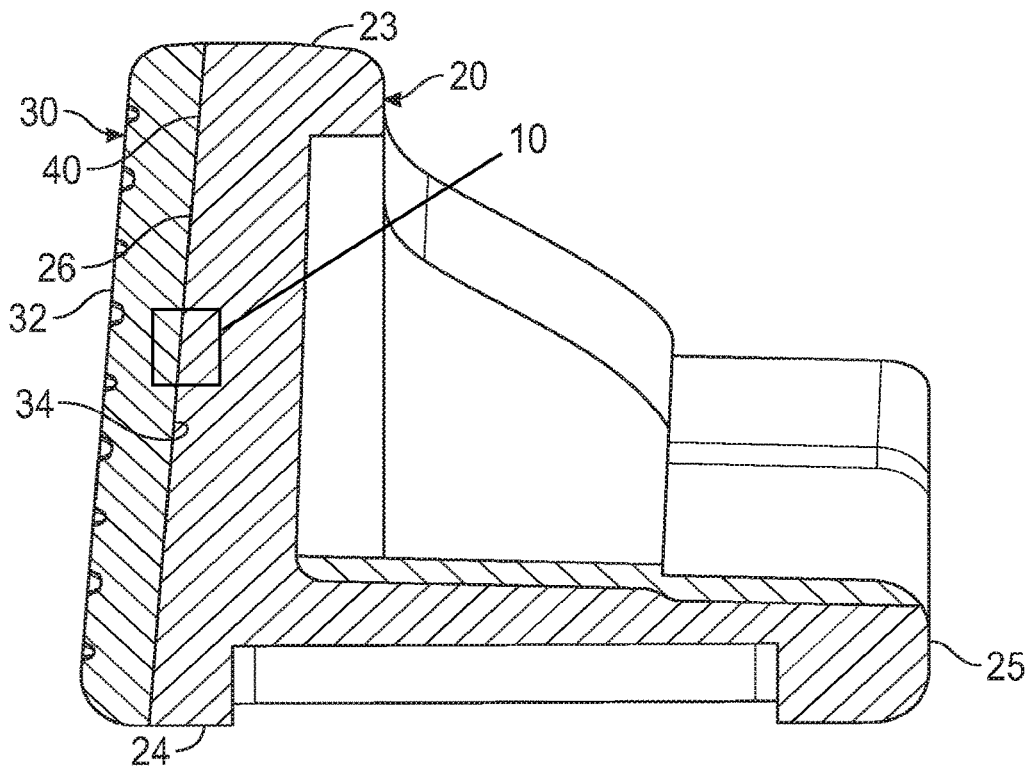
FIG. 4 is a cross-sectional view of the golf club head shown in FIG. 2 along lines 4-4.

The face piece 30 covers at least a center region 15 of the club head 10, and more preferably the entirety of the front face surface 26 of the body piece 20. The center region 15 is defined as the area extending from the top-most edge of the front face surface 26 to the bottom-most edge of the front face surface 26 and also 1.00 inch in both toe side and heel side directions from a centerline 12 extending vertically through the geometric center 14 of the body piece 20, as shown in FIG. 2. The center region 15 is the area of the club head 10 intended to make contact with a golf ball, e.g., the impact area.

Figure 5:
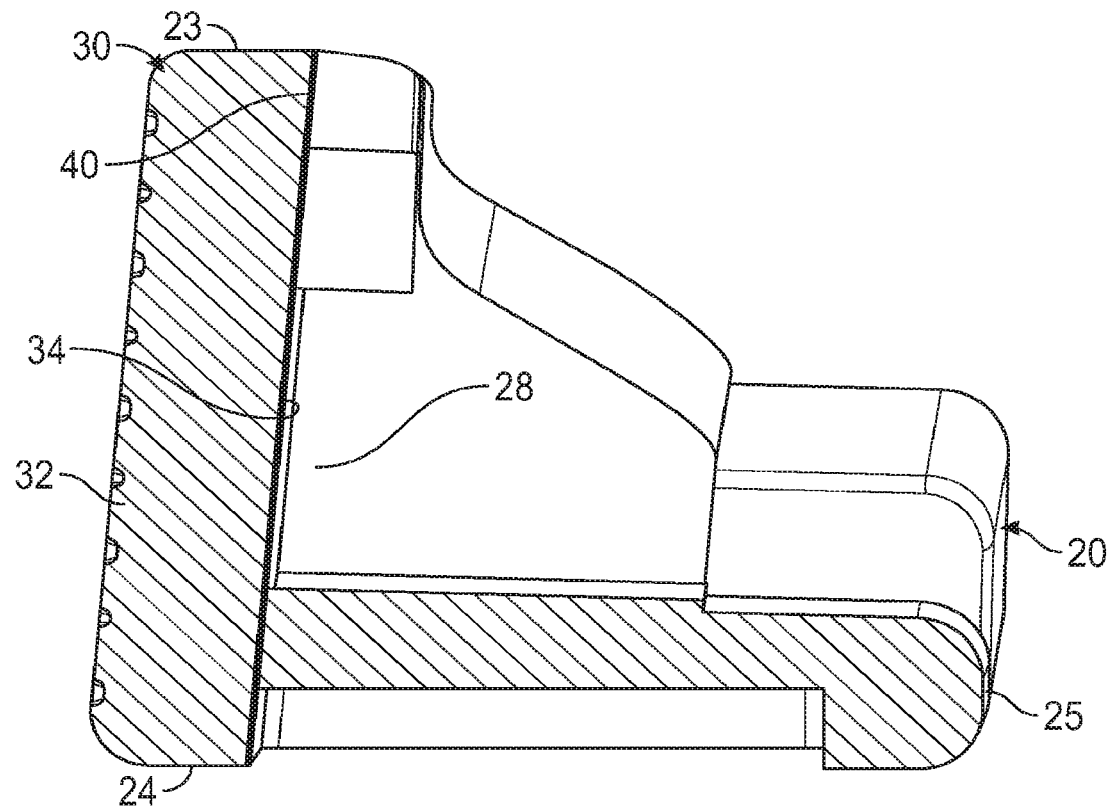
FIG. 5 is a cross-sectional view of an alternative embodiment of the golf club head shown in FIG. 2 along lines 5-5.

The face piece 30 should be a minimum of 0.020 inch thick, across both the striking face portion 32 and the second hosel portion 65. If the face piece 30 is at least 0.060 inch thick, after it is applied to the body piece 20, the body piece 20 can be machined to create a through-opening 28 so that the face material is visible from the back side of the club head 10, and much of the center region 15 will consist only of the copper-containing face material, as shown in FIG. 5. Though the Figures show a constant thickness of the striking face portion 32 of the face piece 30, it may in alternative embodiments have a non-uniform thickness to improve the dynamic response of the entire golf club head. It is preferable, however, that the thickness of the second hosel portion 65 have a variable thickness to control for stress and vibration in the hosel 68.

To promote better, and more consistent, feel to the golfer; the secondary material and the base material have different hardness values. The secondary material preferably has a hardness that is between 35% to 85%, and more preferably 40% to 60%, of the hardness of the base material. For example, in one prototype that performed well, the secondary material had a hardness of 100-110 HV, and the body material a hardness of 200-240 HV.

In order to change how the club head 10 reacts to vibration upon the impact with a golf ball, the materials have different moduli of elasticity. In particular, the secondary material preferably has a modulus of elasticity that is between 40% to 80%, and more preferably 55% to 75%, of the modulus of elasticity of the body material. In the tested version, the body material had a modulus of elasticity of 28.0 Msi and the secondary material has a modulus of elasticity of 18.5 Msi, approximately 66% that of the primary material.

In the preferred embodiment, the density of the secondary and base materials are different in order to optimize performance by changing mass properties. The density of the secondary material preferably has a density that differs from the density of the body material by at least 10% (higher or lower). In the tested version, the secondary material density was 10% higher than the density of the body material It is preferable that the strain (defined as $\Delta L/L$) in the base material be the same as that of the face material at any location along the interface boundaries 40, 45. In particular, the interface boundaries 40, 45 can withstand a high stress load, at least 10 ksi, and no less than 50% of the yield stress, and preferably up to 75% of the yield stress, of the weaker of the base and secondary materials making up the golf club head.

It is preferable that the two materials of the body and face pieces 20, 30 are in direct contact with each other, across all face and hosel surfaces 26, 34, 62, 66, without any intermediate material, for the most efficient loading transmission possible. This is made possible by additive manufacturing. The physical effects of this system are attributable to the differences in the material properties of the individual materials, and how they interact with each other in view of the chosen geometry of the body and face pieces 20, 30. The unique part of this specific concept is due to the way the two materials are directly connected to each other, and how this direct connection, transmits energy through the system during a dynamic (impact) response. The ability for the connection to transmit all types of loading conditions (tensile or compressive force, shear force, bending moment, and torsional moment) at any point in the interface area between the parts is essential to the mechanism. Also essential to the mechanism is the fact that the connection acts linearly, as opposed to the non-linear connection created by the typical adhesive family commonly used in prior art assemblies (e.g., epoxies, cyano-acrylates, polyurethane, etc.).

With respect to the hosel 68, the material differences are magnified in areas that have higher stress and strain; the hosel 68 undergoes more stress than the remainder of the club head 10, and therefore experiences more strain, Whether the effect is a change in bending dynamics or damping, the higher stressed areas exhibit more of an effect.

Figure 6:
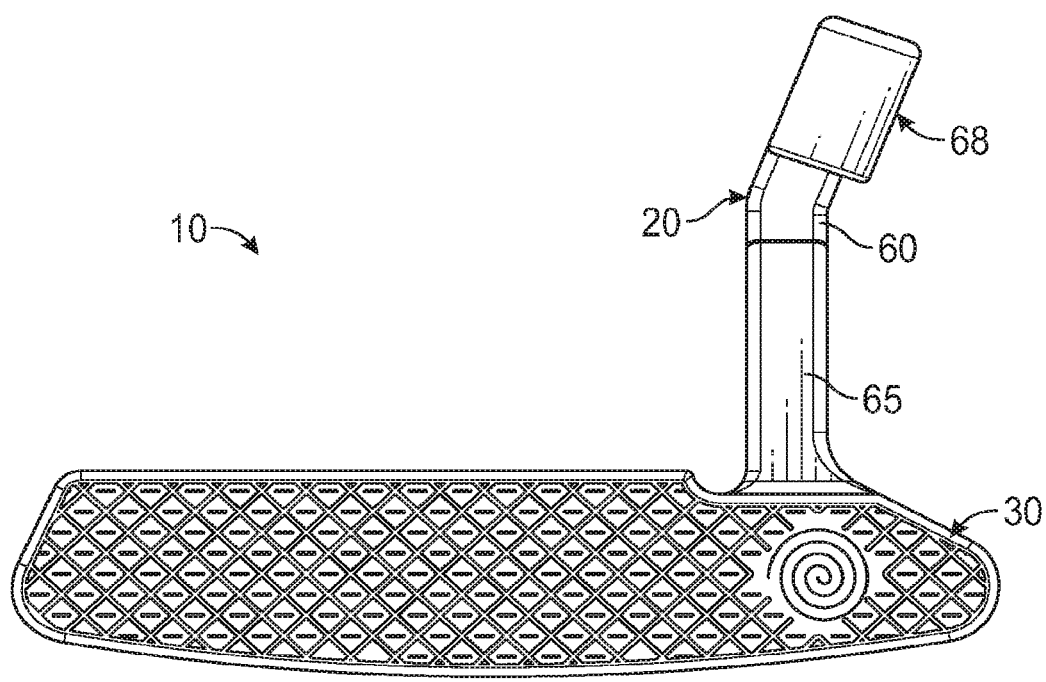
FIG. 6 is a front elevational view of a second embodiment of the golf club head of the present invention.
Figure 7:
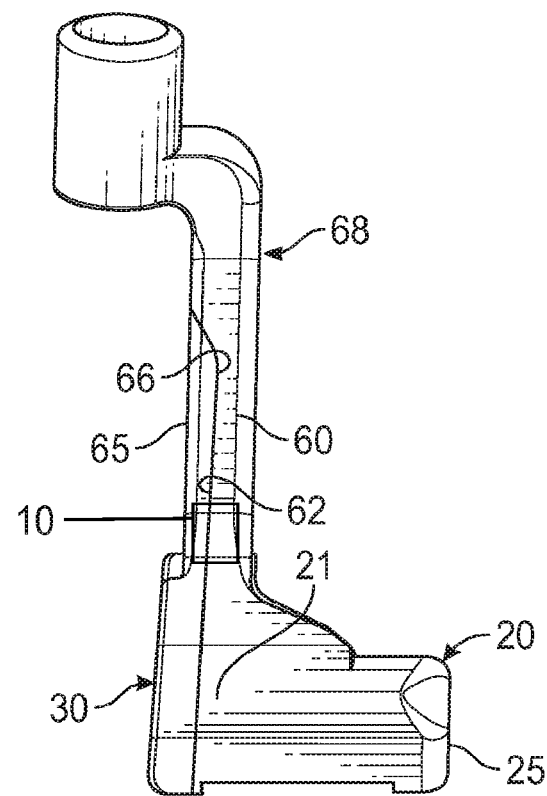
FIG. 7 is a side elevational view of the golf club head shown in FIG. 6.
Figure 8:
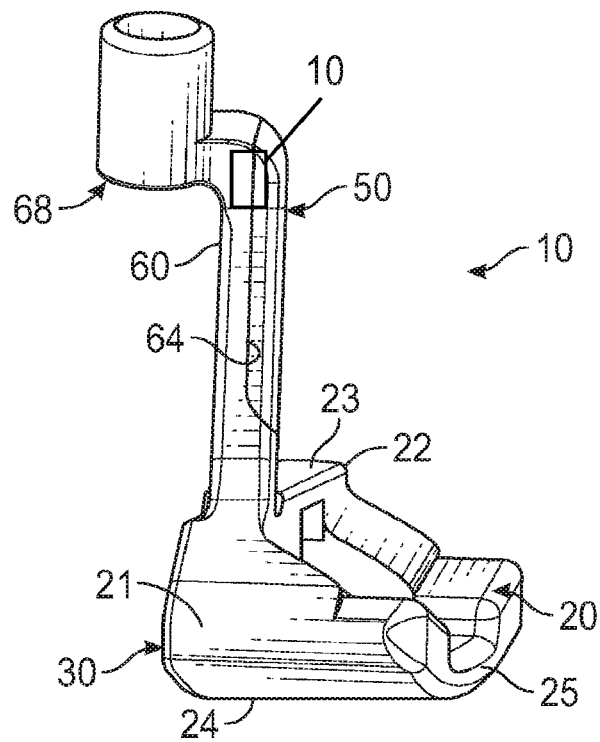
FIG. 8 is a side elevational view of a third embodiment of the golf club head of the present invention.
Figure 9:
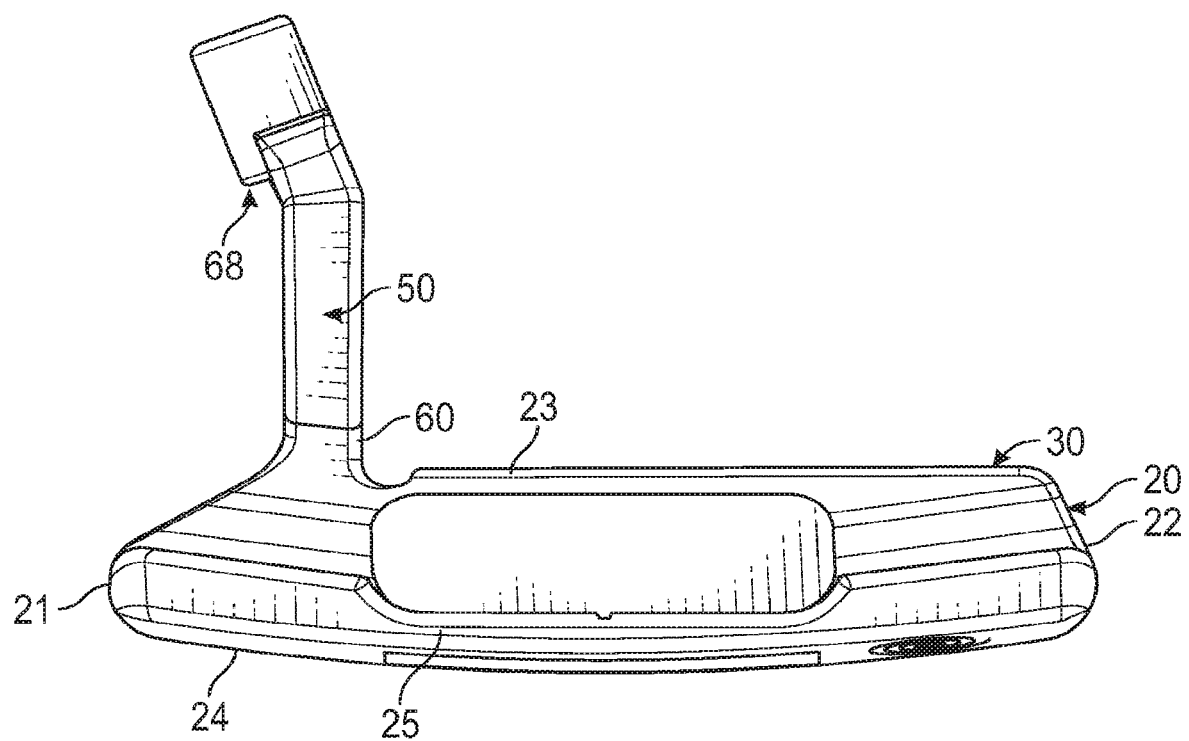
FIG. 9 is a rear elevational view of the golf club head shown in FIG. 8.

The materials and principles described above with respect to the preferred embodiment may be applied to alternative embodiments of the present invention. For example, in the embodiment shown in FIGS. 6-7, the golf club head has a body 20 and hosel 68, both of which are shaped differently from the first embodiment, with the first hosel portion 60 making up the majority of the mass of the hosel 68. In this embodiment, the second hosel portion 65 does not extend as far up the hosel 68 as the first embodiment. In a third embodiment, shown in FIGS. 8 and 9, the face piece 30 does not include a second hosel portion 65. Instead, the golf club head 10 comprises a hosel piece 50 that is affixed to a rear surface 64 of the first hosel portion 60 and spaced a distance of at least 0.250 inch vertically from the top surface 23 of the body. The hosel piece 50 is formed of the same material as the face piece 30, and its location at the rear of the hosel 68 helps to damp vibrations. In alternative embodiments, the second hosel portion 65 or hosel piece 50 may extend the entire vertical length of the hosel 68.

It is important to note that, in all of the embodiments disclosed herein, the pieces can directly transmit tensile or compressive force, shear force, bending moment, and torsional moment at all locations where the base and secondary materials contact one another. Furthermore, the base material has a different hardness and modulus of elasticity than the secondary material, and the base and secondary materials may potentially have different densities.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim:

1. A putter head comprising:
    a body piece comprising a heel side, a toe side, a top surface, a bottom surface, a rear side, a first hosel portion, a front face surface, and a front hosel surface; and
    a face piece comprising a face portion, a second hosel portion, a face rear surface, and a hosel rear surface,
    wherein the entirety of the face rear surface makes direct contact with the front face surface to form a face interface boundary, wherein at least a portion of the hosel rear surface makes direct contact with the front hosel surface to form a hosel interface boundary, wherein the hosel interface boundary is contiguous with the face interface boundary, wherein the body piece is composed of a first metal material having a first hardness, wherein the face piece is composed of a second metal material having a second hardness, wherein the first metal material comprises a first density, wherein the second metal material comprises a second density that differs from the first density by at least 10%, and wherein the face portion has a thickness of at least 0.020 inch.

2. The putter head of claim 1, wherein the front surface of the body comprises a geometric center and a center region, wherein the center region is an area extending one inch toward the toe side and one inch toward the heel side from a centerline extending vertically through the geometric center, and wherein the face piece covers the center region.

3. The putter head of claim 1, wherein the second metal material has a hardness of 100-110 HV.

4. The putter head of claim 1, wherein the first material has a hardness of 200-240 HV.

5. The putter head of claim 1, wherein the rear surface and the front surface transmit tensile and compressive force, shear force, bending moment, and torsional moment at both the face interface boundary and the hosel interface boundary.

6. The putter head of claim 1, wherein the face portion has a constant thickness, and wherein each of the first hosel portion and the second hosel portion has a variable thickness.

7. The putter head of claim 1, wherein the strain of the first material is the same as the strain of the second material at both the face interface boundary and the interface boundary, and wherein the interface boundary can withstand no less than 50% of a yield stress of the weaker of the first and second materials.

8. The putter head of claim 7, wherein the interface boundary can withstand up to 75% of the yield stress of the weaker of the first and second materials.

9. The putter head of claim 1, wherein the first metal material is stainless steel and the second metal material is an alloy comprising at least 55% copper by weight.

10. The putter head of claim 1, wherein the putter head has a mass of 300 grams to 400 grams.

11. A putter head comprising:
a body piece comprising a heel side, a toe side, a top surface, a bottom surface, a rear side, a hosel portion, a front face surface, and a hosel rear surface;
a face piece comprising a face portion and a face rear surface; and
a hosel piece comprising a hosel front surface,
wherein a majority of the face rear surface makes direct contact with the front face surface to form a face interface boundary,
wherein at least a portion of the hosel rear surface makes direct contact with the hosel front surface to form a hosel interface boundary,
wherein the body piece is composed of a first metal material having a first hardness and a first modulus of elasticity,
wherein each of the face piece and hosel piece is composed of a second metal material having a second hardness and a second modulus of elasticity,
wherein the first metal material comprises a first density,
wherein the second metal material comprises a second density that differs from the first density by at least 10%, and
wherein the face portion has a thickness of at least 0.020 inch.

12. The putter head of claim 11, wherein the first metal material is a stainless steel, and wherein the second metal material is an alloy comprising at least 55% copper by weight.

13. The putter head of claim 11, wherein the hosel piece is spaced at least 0.250 inch from a top surface of the body.

14. The putter head of claim 11, wherein at least one of the first and second metal materials is an alloy comprising at least 55% copper by weight.

15. The putter head of claim 11, wherein each of the hosel portion and the hosel piece has a variable thickness.

16. The putter head of claim 11, wherein the body piece comprises a through-opening, and wherein a portion of the rear surface of the face piece is visible through the through-opening.

* * * * *